United States Patent
Ichiyoshi

[11] Patent Number: 5,311,555
[45] Date of Patent: May 10, 1994

[54] PHASE DIVIDER FOR COMPLEX SIGNALS
[75] Inventor: Osamu Ichiyoshi, Tokyo, Japan
[73] Assignee: Nec Corporation, Japan
[21] Appl. No.: 954,664
[22] Filed: Sep. 30, 1992
[30] Foreign Application Priority Data
  Sep. 30, 1991 [JP] Japan .................. 3-250757
[51] Int. Cl.⁵ .................. H03D 3/22; H04L 27/22
[52] U.S. Cl. .................. 375/86; 375/83; 332/103; 329/304; 307/540
[58] Field of Search .................. 375/83, 86, 106, 118; 332/103; 307/540, 510, 511, 262; 329/304, 307; 328/155, 133, 76.82, 76.47; 455/276.1

[56] References Cited
U.S. PATENT DOCUMENTS

| | | | |
|---|---|---|---|
| 4,057,759 | 11/1977 | Genova et al. | 375/86 X |
| 4,065,722 | 12/1977 | Francis | 329/304 X |
| 4,092,606 | 5/1978 | Ryan | 375/86 X |
| 4,989,220 | 1/1991 | Serrone | 329/304 X |
| 5,056,122 | 10/1991 | Price | 329/304 X |
| 5,090,027 | 2/1992 | Ohsawa | 375/86 X |
| 5,255,289 | 10/1983 | Tomita | 375/86 |

Primary Examiner—Stephen Chin
Assistant Examiner—Bryan Webster
Attorney, Agent, or Firm—Ostrolenk, Faber, Gerb & Soffen

[57] ABSTRACT

In a phase divider, a complex signal containing a sequence of samples of real and imaginary values is limited to a unit amplitude and multiplied by a first complex multiplier with a first feedback complex signal, the output the multiplier being fed through a loop filter to a second complex multiplier where the signal is multiplied with a second feedback complex signal. The output of the second multiplier is limited to a unit amplitude, delayed by a sample interval and applied to the second complex multiplier as the second feedback complex signal. The first feedback complex signal is derived by a circuit that raises the frequency the delayed signal by a desired factor.

4 Claims, 2 Drawing Sheets

LOOP FILTER 3

PHASE DIVIDER FOR COMPLEX SIGNALS

BACKGROUND OF THE INVENTION

The present invention relates generally to phase dividers, and more particularly to a frequency divider for quadrature signals.

In synchronous detectors for M-ary phase shift keyed signals, a series of an M-th power multiplier, a low-pass filter and a 1/M frequency divider is connected to the output of an A/D converter to recover the transmitted carrier for synchronously detecting the original signal. The 1/M frequency divider comprises an xy-to-θ (phase) conversion table which detects the phase angle of quadrature (complex) signals from the A/D converter and supplies it to a phase divider that divides the detected phase angle with a ratio 1/N. The output of the phase divider is coupled to a sine translation table and a cosine translation table to generate cosine (real part) and sine (imaginary part) wave signals. The phase $\theta_i$ of the input signal to the 1/M frequency divider is defined within the range between $-\pi$ and $+\pi$. If there is a phase change of $2\pi$, the input phase can be represented as $\theta'_i = \theta_i + 2\pi$. However, the phase conversion table cannot discriminate between $\theta'_i$ and $\theta''_i$ and treats the input phase equivalently as $\theta''_i = \theta_i \pmod{2\pi}$. Under such circumstances, the division by the phase divider results in a phase angle $\theta''_i/M = \theta_i/M$. Since it must be $\theta'_i/M = \theta_i/M + 2\pi/M$, a phase error of $2\pi/M$ results.

SUMMARY OF THE INVENTION

It is therefore an object of the present invention to provide a phase divider capable of phase division without introducing quantum variations of phase.

The phase divider of the present invention comprises a first complex limiter for receiving a variable amplitude input complex signal formed by a sequence of samples of real and imaginary values for limiting the amplitude of the complex signal to a constant amplitude of unit value. A first complex multiplier multiplies the complex signal from the first complex limiter with a first feedback complex signal and applies its output through a loop filter to a second complex multiplier where the input signal is multiplied with a second feedback complex signal. A second complex limiter is provided for limiting the amplitude of the signal from the second complex multiplier to a constant amplitude of unit value. The output of the second complex limiter is delayed by a sample interval and applied to the second complex multiplier as the second feedback complex signal. A complex multiplier of M-th power raises the delayed complex signal to an M-th power and applies it to the first complex multiplier as the first feedback complex signal.

Each of the complex limiters comprises first and second squaring circuits for respectively squaring the real and imaginary components of an input signal applied to the limiter, an adder for summing outputs of the first and second squaring circuits, a root-and-divide-one circuit for detecting a square root of an output signal of the adder and dividing a unit value by the detected square root, and first and second multipliers for multiplying the real and imaginary components of the input signal with an output signal of the root-and-divide-one circuit.

BRIEF DESCRIPTION OF THE DRAWINGS

The present invention will be described in further detail with reference to the accompanying drawings, in which.

DETAILED DESCRIPTION

Figure 1:
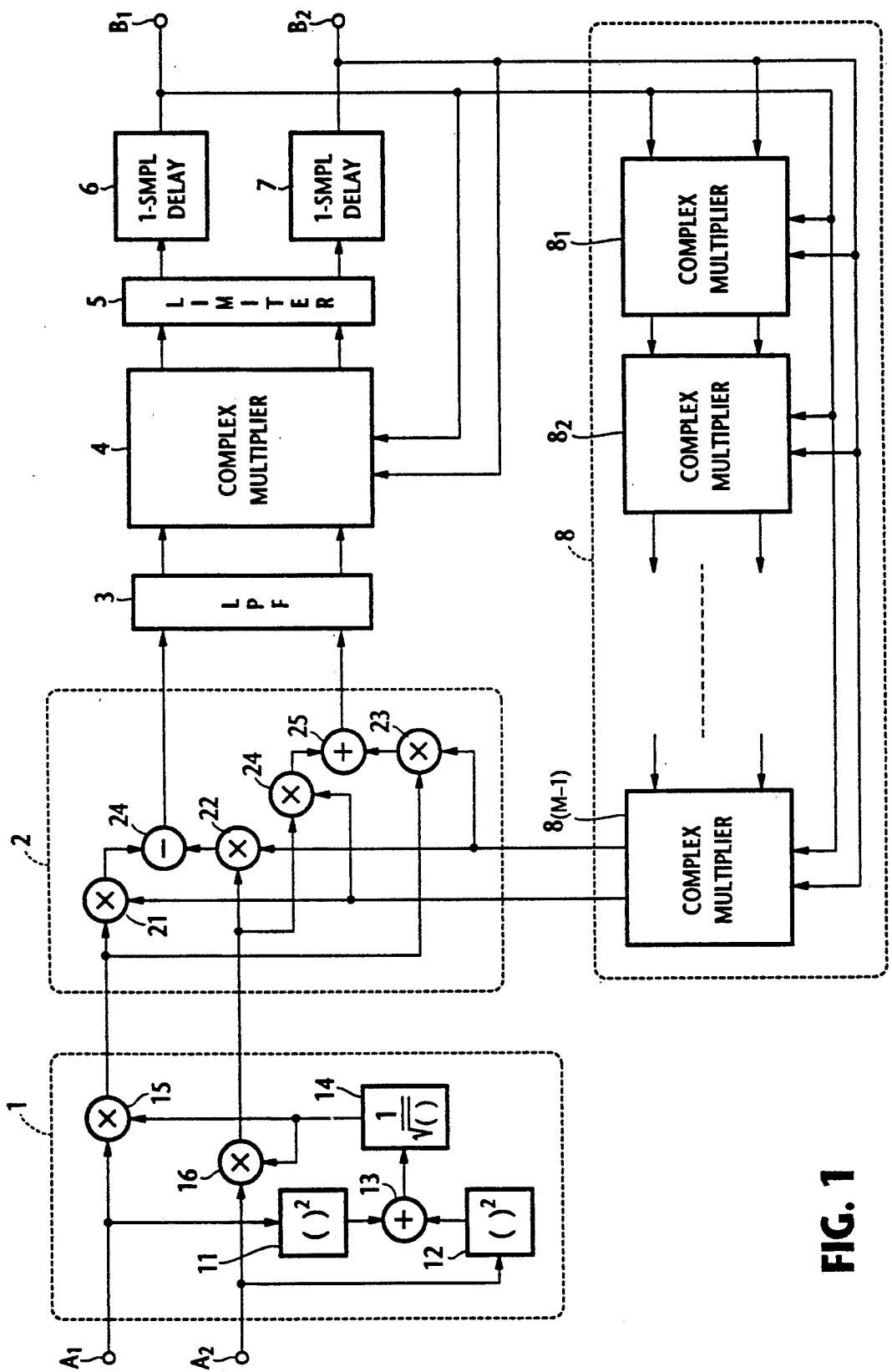
FIG. 1 is a block diagram of a phase divider of the present invention.

In FIG. 1, a phase divider of the present invention comprises a first complex limiter 1 for receiving through input terminals $A_1$, $A_2$ a variable amplitude input complex signal which is a sequence of digital samples of real and imaginary values for limiting the amplitude of the input complex signal to a constant amplitude of unit value. A first complex multiplier 2 is connected to the outputs of the first complex limiter 1 for multiplying the complex signal from the first complex limiter 1 with a first feedback complex signal supplied from a complex multiplier 8 of M-th power which is connected to the outputs of one-sample delay circuits 6, 7. The M-th power complex multiplier 8 is a series of are complex multipliers $8_1$, $8_2$, ... $8_{(M-1)}$, each multiplying the input complex signal from one-sample delay circuits 6, 7 with the output of the preceding stage.

A complex low-pass (loop) filter 3 is connected between the first complex multiplier 2 and a second complex multiplier 4 having identical configuration to multiplier 2 to remove high frequency components. The second complex multiplier 4 multiplies the outputs of low-pass filter 3 with a second complex feedback signal from the output terminals $B_1$, $B_2$. A second complex limiter 5, identical to limiter 1, is connected to the outputs of multiplier 4 for limiting the amplitude of the input complex signal therefrom to a constant amplitude of unit value. One-sample delay circuits 6 and 7 are provided for introducing a one-sample interval to the outputs of limiter 5 for application to output terminals $B_1$, $B_2$, on the one hand, and to the second complex multiplier 4 as the second feedback complex signal, on the other.

As illustrated, complex limiter 1 is made up of squaring circuits 11 and 12 connected to input terminals $A_1$ and $A_2$, respectively, the outputs of squaring circuits 11, 12 being summed by an adder 13 and fed to a root-and-divide-one circuit 14. Multipliers 15 and 16 are respectively connected to input terminals $A_1$ and $A_2$ to multiply the real and imaginary components of the input complex signal with the output of root-and-divide-one circuit 14. If the input complex signal is represented as $W_1 = u_1 + j \cdot v_1$, where $u_1$ and $v_1$ are the real and imaginary parts of the signal, respectively, then the outputs of multipliers 15 and 16 form an output complex signal $W_2$ which is given by:

$$W_2 = u_2 + j \cdot v_2 = \frac{u_1 + j \cdot v_1}{\sqrt{u_1^2 + v_1^2}}$$

Since $$|W_2|^2 = \frac{u_1^2 + v_1^2}{u_1^2 + v_1^2} = 1,$$

the amplitude of the input complex signal of limiter 1 is normalized to a constant amplitude of unit value.

Complex multiplier 2 comprises a first pair of multipliers 21 and 22 and a second pair of multipliers 23 and 24. The first input of multipliers 21 and 23 is connected to the output of multiplier 15 and the first input of multipliers 22 and 24 is connected to the output of multiplier 16. A subtractor 24 is connected between the outputs of the multipliers of the first pair to produce a signal which forms the real part of the complex output of multiplier 2. An adder 25 is connected between the outputs of the multipliers of the second pair to produce a signal which forms the imaginary part of the output. The second input of multipliers 21 and 24 is connected to one output of multiplier 8, the second input of multipliers 22 and 23 being connected to the other output of multiplier 8. If the feedback complex signal from multiplier 8 is represented as $W_3 = u_3 + j\ v_3 = r_3\ e^{j\theta_3}$ and the complex signal from the preceding stage is represented as $W_2 = u_2 + j\ v_2 = r_2\ e^{j\theta_2}$, then the complex output of multiplier 2 is:

$$\begin{aligned} W_2 \times W_3 &= (u_2 u_3 - v_2 v_3) + j(u_2 u_3 + v_2 v_3) \\ &= (u_2 + jv_2)(u_3 + jv_3) \\ &= r_2 r_3\ e^{j(\theta_2 + \theta_3)}. \end{aligned}$$

Since $W_2$ and $W_3$ are both normalized to unit value, $W_2 \times W_3$ is equal to $e^{j(\theta_2 + \theta_3)}$.

Figure 2:
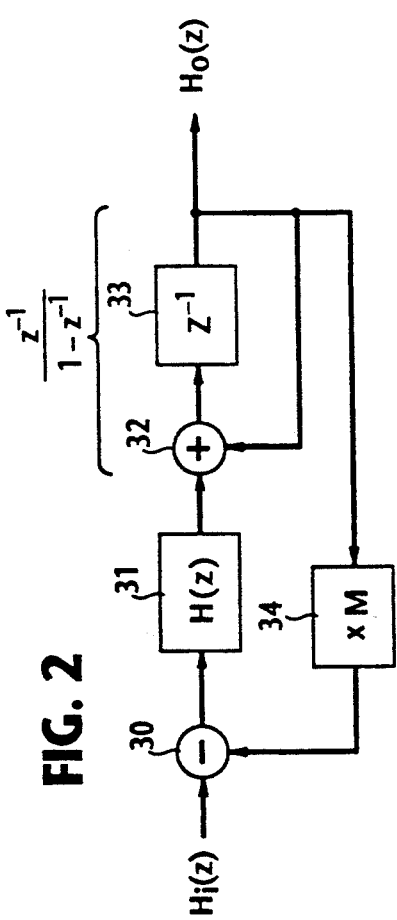
FIG. 2 is an equivalent block diagram of FIG. 1.

It is seen that by normalizing the amplitude of complex signals to a unit value the multiplication of these signals is equivalent to a summation of their phase components. An equivalent circuit of the phase divider can be represented is shown in FIG. 2 as comprising a subtractor 30 corresponding to multiplier 2, loop filter 31 corresponding to filter 3, an adder 32 corresponding to multiplier 4, delay operator 33, and a M-fold phase multiplier 34 corresponding to M-th power multiplier 8. In FIG. 2, the signals are represented by z-transform of input phase $\theta_i(t)$ and output phase $\theta_o(t)$, where $z = e^{j\omega T}$ (T=sampling intervals) and the following relations hold:

$$\left. \begin{aligned} H_i(z) &= \sum_n \theta_i(n) z^{-n} \\ H_o(z) &= \sum_n \theta_o(n) z^{-n} \end{aligned} \right\} \quad (1)$$

Since $H_o(z) = H(z) \cdot z^{-1}/(1 - z^{-1})\{H_i(z) - M \cdot H_o(z)\}$, the transfer function T(z) of the phase divider is given by the following relation:

$$T(z) = \frac{H_o(z)}{H_i(z)} = \frac{H(z)\dfrac{z^{-1}}{1 - z^{-1}}}{1 + M \cdot H(z)\dfrac{z^{-1}}{1 - z^{-1}}} \quad (2)$$

$$= \frac{1}{M} \cdot \frac{M \cdot H(z)\dfrac{z^{-1}}{1 - z^{-1}}}{1 + M \cdot H(z)\dfrac{z^{-1}}{1 - z^{-1}}}$$

Since the $M \cdot H(z)$ terms of Equation (2) imply that the loop filter has a gain M, and so Equation (2), as a whole, indicates that the phase divider of the present invention has the effect of dividing an input phase with a ratio M without introducing undesirable quantum phase "jumps".

Figure 3:
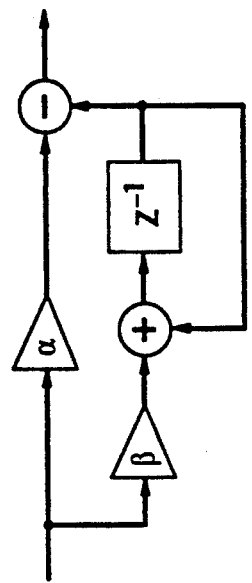
FIG. 3 is a circuit diagram of the loop filter of FIG. 1.

If loop filter 3 is constructed as shown in FIG. 3 having the following z-transform function H(z):

$$H(z) = \alpha + \frac{\beta \cdot z^{-1}}{1 - z^{-1}} \quad (3)$$

then, the transfer function T(z) is given by:

$$T(z) = \frac{1}{M} \cdot \frac{M\left(\alpha + \dfrac{\beta z^{-1}}{1 - z^{-1}}\right)\dfrac{z^{-1}}{1 - z^{-1}}}{1 + M\left(\alpha + \dfrac{\beta z^{-1}}{1 - z^{-1}}\right)\dfrac{z^{-1}}{1 - z^{-1}}} \quad (4)$$

By denoting $M\alpha = A$, $M\beta = B$, Equation (4) can be rewritten as:

$$T(z) = \frac{1}{M} \cdot \frac{A\dfrac{z^{-1}}{1 - z^{-1}} + B\left(\dfrac{z^{-1}}{1 - z^{-1}}\right)^2}{1 + A\dfrac{z^{-1}}{1 - z^{-1}} + B\left(\dfrac{z^{-1}}{1 - z^{-1}}\right)^2} \quad (5)$$

If $z = e^{s/fs}$, (where fs is the sampling frequency), and if the sampling frequency is sufficiently high, $z = e^{s/fs} \approx H \cdot s/fs$, and $z \approx 1$, and T(z) is represented as:

$$\begin{aligned} T(z) \approx T(s) &= \frac{1}{M} \cdot \frac{A \cdot fs \cdot S + B \cdot fs^2}{S^2 + A \cdot fs \cdot S + B \cdot fs^2} \quad (6) \\ &= \frac{1}{M} \cdot \frac{2\zeta \cdot \omega_n \cdot S + \omega_n^2}{S^2 + 2\zeta \cdot \omega_n \cdot S + \omega_n^2} \end{aligned}$$

where, $$\omega_n = \sqrt{B} \cdot fs \text{ and } \zeta = \frac{1}{2} - \frac{A}{\sqrt{B}}.$$

Equation (6) indicates that the phase divider operates in a manner similar to conventional phase locked loops.

Figure 4:
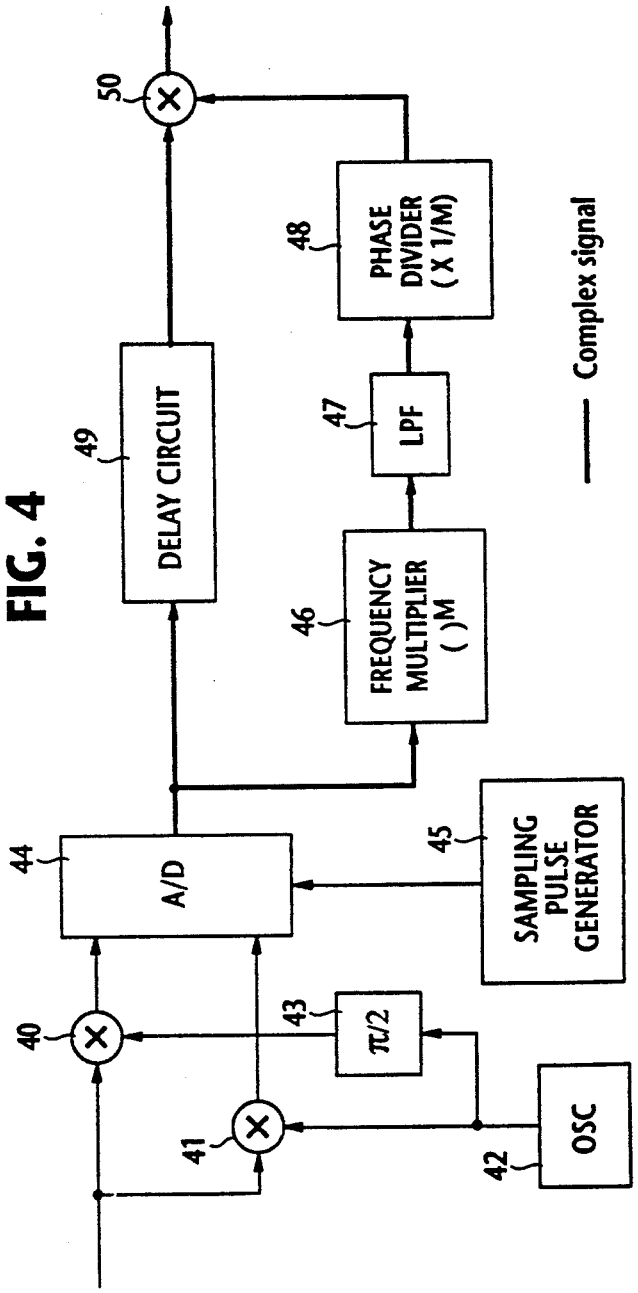
FIG. 4 is a block diagram of a synchronous detector for an M-ary PSK signal incorporating the phase divider of the present invention.

The phase divider of the present invention is incorporated in a synchronous detector for M-ary phase-shift keying signals as shown in FIG. 4. The synchronous detector comprises mixers 40, 41 for mixing an incoming IF (intermediate frequency) signal with an in-phase carrier from a local oscillator 42 and a quadrature-phase carrier supplied from a phase shifter 43. The outputs of mixers 40, 41 are converted to digital signals of complex values by an A/D converter 44 in response to a sampling pulse from a pulse generator 45. The digital complex signal from A/D converter 44 is applied to a M-th power frequency multiplier 46 where the frequency is raised to M times the input frequency and fed through a low-pass filter 47. The 1/M phase divider 48 of the present invention takes its input from the low-pass filter 47, where the phase angle $\theta$ is divided by a factor M as described above so that the frequency of the signal from multiplier 46 is reduced to the baseband frequency. The output of A/D converter 44 is coupled through an appropriate delay circuit 49 to a complex multiplier 50 where it is multiplied with the output of phase divider 48 to synchronously detect the original digital signal.

It is seen the present invention eliminates the need for xy-to-$\theta$ conversion table and cosine and sin tables which are required with the prior art phase dividers.

What is claimed is:

1. A phase divider comprising:
   a first complex limiter for receiving a variable amplitude input complex signal formed by a sequence of samples of real and imaginary values for limiting the amplitude of said complex signal to a constant amplitude of unit value;
   a first complex multiplier for multiplying the complex signal from said first complex limiter with a first feedback complex signal applied thereto;
   loop filter means connected to the output of said first complex multiplier;
   a second complex multiplier for multiplying a complex signal from said loop filter means with a second feedback complex signal applied thereto;
   a second complex limiter for limiting the amplitude of a complex signal from said second complex multiplier to a constant amplitude of unit value;
   one-sample delay means for delaying the complex signal from said second complex limiter for a sample interval and applying the delayed complex signal to said second complex multiplier as said second feedback complex signal; and
   a complex multiplier of M-th power for raising the delayed complex signal to an M-th power and applying the M-power raised complexed signal to said first complex multiplier as said first feedback complex signal.

2. A phase divider as claimed in claim 1, wherein each of said first and second complex limiters comprises:
   first and second squaring circuits for respectively squaring the real and imaginary components of an input signal applied to the limiter;
   an adder for summing outputs of the first and second squaring circuits;
   a root-and-divide-one circuit for detecting a square root of an output signal of said adder and dividing a unit value by the detected square root; and
   first and second multipliers for multiplying the real and imaginary components of said input signal with an output signal of said root-and-divide-one circuit.

3. In a synchronous detector having a frequency multiplier for multiplying frequency of a digital complex signal from an analog-to-digital (A/D) converter, a low-pass filter connected to the output of said frequency divider, and a complex multiplier having a first input for receiving said complex signal from said A/D converter through delay means, and a second input, a phase divider comprising:
   a first complex limiter for limiting amplitude of a complex signal from said low-pass filter to a constant amplitude of unit value;
   a first complex multiplier for multiplying the complex signal from said first complex limiter with a first feedback complex signal applied thereto;
   loop filter means connected to the output of said first complex multiplier;
   a second complex multiplier for multiplying a complex signal from said loop filter means with a second feedback complex signal applied thereto;
   a second complex limiter for limiting the amplitude of a complex signal from said second complex multiplier to a constant amplitude of unit value;
   one-sample delay means for delaying the complex signal from said second complex limiter for a sample interval and applying the delayed complex signal to said second complex multiplier as said second feedback complex signal and applying the delayed complex signal to the second input of the complex multiplier of the synchronous detector; and
   a complex multiplier of M-th power for raising the delayed complex signal to an M-th power and applying the M-power raised complexed signal to said first complex multiplier as said first feedback complex signal.

4. A phase divider as claimed in claim 3, wherein each of said first and second complex limiters comprises:
   first and second squaring circuits for respectively squaring the real and imaginary components of an input signal applied to the limiter;
   an adder for summing outputs of the first and second squaring circuits;
   a root-and-divide-one circuit for detecting a square root of an output signal of said adder and dividing a unit value by the detected square root; and
   first and second multipliers for multiplying the real and imaginary components of said input signal with an output signal of said root-and-divide-one circuit.

* * * * *